United States Patent [19]

Eyb et al.

[11] Patent Number: 4,921,265

[45] Date of Patent: May 1, 1990

[54] FRONT AXLE

[75] Inventors: Wolfgang Eyb, Leonberg; Walter Schaible, Hemmingen, both of Fed. Rep. of Germany

[73] Assignee: Dr. Ing. H.C.F. Porsche Aktiengesellschaft, Stuttgart, Fed. Rep. of Germany

[21] Appl. No.: 296,127

[22] Filed: Jan. 12, 1989

[30] Foreign Application Priority Data

Jan. 21, 1988 [DE] Fed. Rep. of Germany ....... 3801640

[51] Int. Cl.$^5$ .......................... B60G 7/02; B60G 3/00; B60B 35/10
[52] U.S. Cl. .................................. 280/96.1; 180/209; 180/906
[58] Field of Search ................ 280/96.1; 180/209, 906

[56] References Cited

U.S. PATENT DOCUMENTS 4,359,123 11/1982 Haupt et al. ......................... 180/906

4,639,006 1/1987 Aikawa ................................ 280/96.1

FOREIGN PATENT DOCUMENTS 3151369 8/1982 Fed. Rep. of Germany .
2627847 11/1982 Fed. Rep. of Germany .
3708037 10/1987 Fed. Rep. of Germany .

Primary Examiner—Kenneth R. Rice
Attorney, Agent, or Firm—Barnes & Thornburg

[57] ABSTRACT

A front axle for motor vehicles, especially for the use for different tracks essentially includes a cross bearer secured at the vehicle body as well as wheel guide members retained at the cross bearer by way of joints. The cross bearer is thereby connected at its end with a wheel guide unit which includes a wheel guide member pivotally retained in joints at a longitudinal bearer; the wheel guide member together with the longitudinal bearer is adapted to be fastened as a unit at the cross bearer as well as at the vehicle body by way of threaded means in two track width positions.

10 Claims, 3 Drawing Sheets

FRONT AXLE

BACKGROUND AND SUMMARY OF THE INVENTION

The present invention relates to a front axle for motor vehicles, especially for the use for different wheel tracks, with a cross bearer secured at the vehicle body as well as with wheel guide members retained at the cross bearer by way of joints.

A front axle with a cross bearer is known from the DE-OS 37 08 037 on which a wheel guide member is pivotally connected by way of joints. The fastening of the axle at a longitudinal bearer of the motor vehicle body takes place by bolts which connect the cross bearer with its forward area directly to the vehicle body. The rear area is secured at the vehicle body at the same time with the guide member bearing support.

It is the object of the present invention to provide a front axle of the aforementioned type which can be utilized in different vehicles, especially for several wheel tracks and in which therebeyond the wheel guide unit of the axle is adapted to be moved and to be fastened at a vehicle in a simple manner whereby the wheel guide member, properly speaking, such as, for example, a triangular guide member can thereby remain connected with the wheel carrier and such wheel track changes require no significant changes in the steering arrangement.

The underlying problems are solved according to the present invention in that the cross bearer is connected at its end with a wheel guide unit which includes a wheel guide member pivotally retained at a longitudinal bearer in the joints, which is adapted to be fastened together with the longitudinal bearer as a unit at the cross bearer as well as at the vehicle body by threaded means in two track positions.

The principal advantages achieved with the present invention reside in that with a unit consisting of a longitudinal bearer as well as of a wheel guide member a utilization for vehicles having different track widths is possible in a simple manner. The attachment takes place by bolts adapted to be fastened at the rear in the cross bearer and in the front in the vehicle body. The entire front axle can also be preassembled outside of the vehicle and together with the steering arrangement can be installed into the vehicle. The cross bearer is preferably secured directly at the vehicle body and the rear end of the longitudinal bearer is connected at the cross bearer member, well accessible from the underside of the vehicle, with the vehicle body by way of bolts. The forward end of the longitudinal bearer is held directly on the body side whereby during the fastening of the longitudinal bearer the wheel guide member is pivotally connected at the same in joints. In addition to the use for two vehicles with different track widths, also a use in a vehicle is possible which is to be refitted for a different track width. A forward joint of the wheel guide member is directly connected with the longitudinal bearer by way of a bearing pin without interconnection of a bracket. A rearwardly disposed joint is retained between formed-on flanges of the longitudinal bearer. The wheel guide member is retained in a stable manner in the longitudinal and cross direction by its joint mounting as well as by the fixed connection with the cross bearer and with the vehicle body and can be installed in a simple manner by way of the few fastening bolts.

Owing to the joint elasticities in the forward joint, in particular longitudinal shocks and impacts are to be elastically absorbed whereby it permits at the same time a cross movement of the wheel guide member within limits. The rear joint forms a so-called fixed bearing with an imaginary point of rotation whereby a wheel position change in the direction of toe-out can take place especially with braking forces.

To permit an unimpaired passage of a transversely extending tie rod from the steering arrangement secured at the cross bearer to the wheel, the longitudinal bearer is provided with a corresponding cast-on through-opening which is so constructed and formed-on at the longitudinal bearer that a track adjustment is possible in a simple manner without disassembly or change of position of the steering arrangement.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
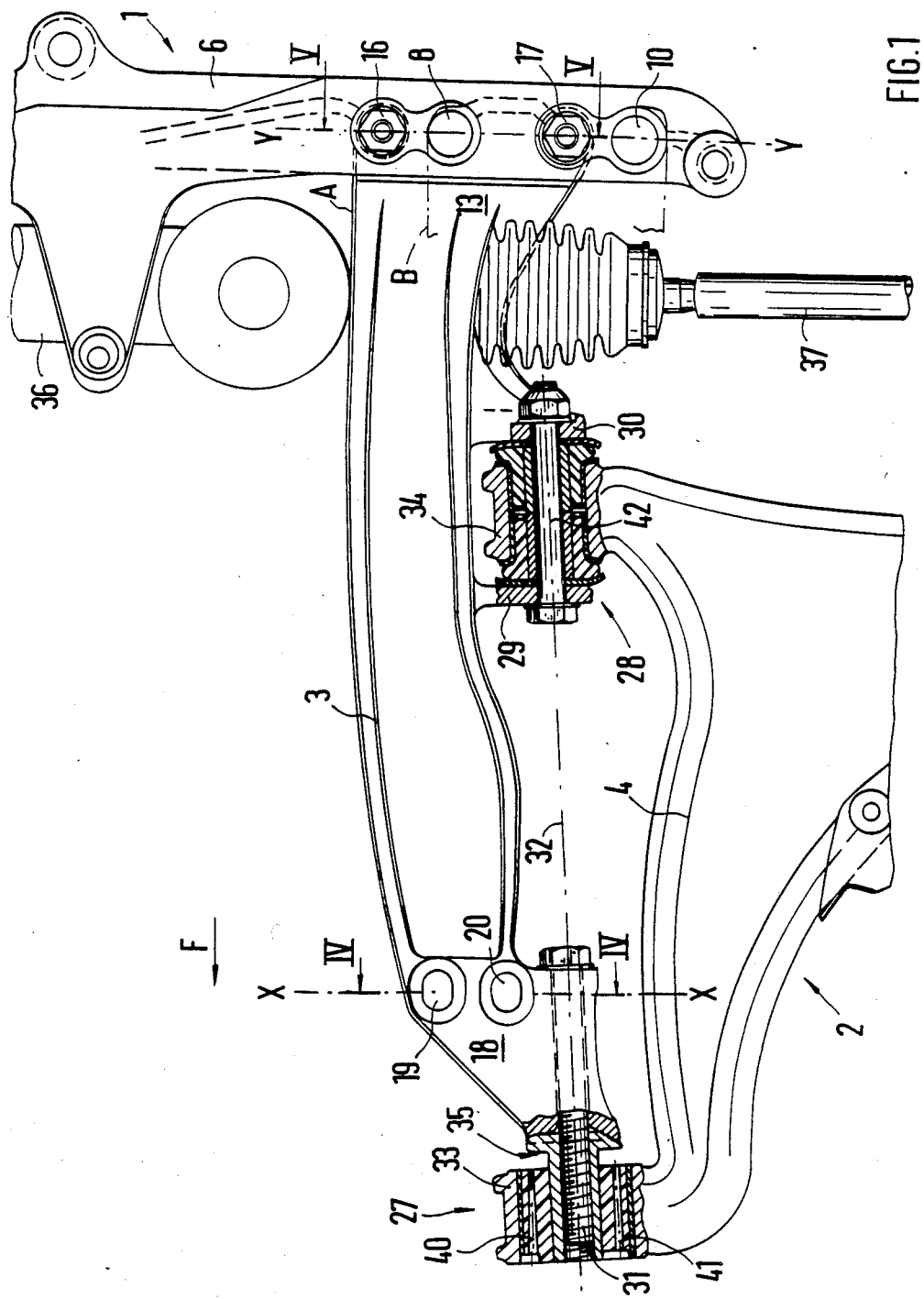
FIG. 1 is a plan view on a left part of a front axle in accordance with the present invention in relation to the driving direction.
Figure 2:
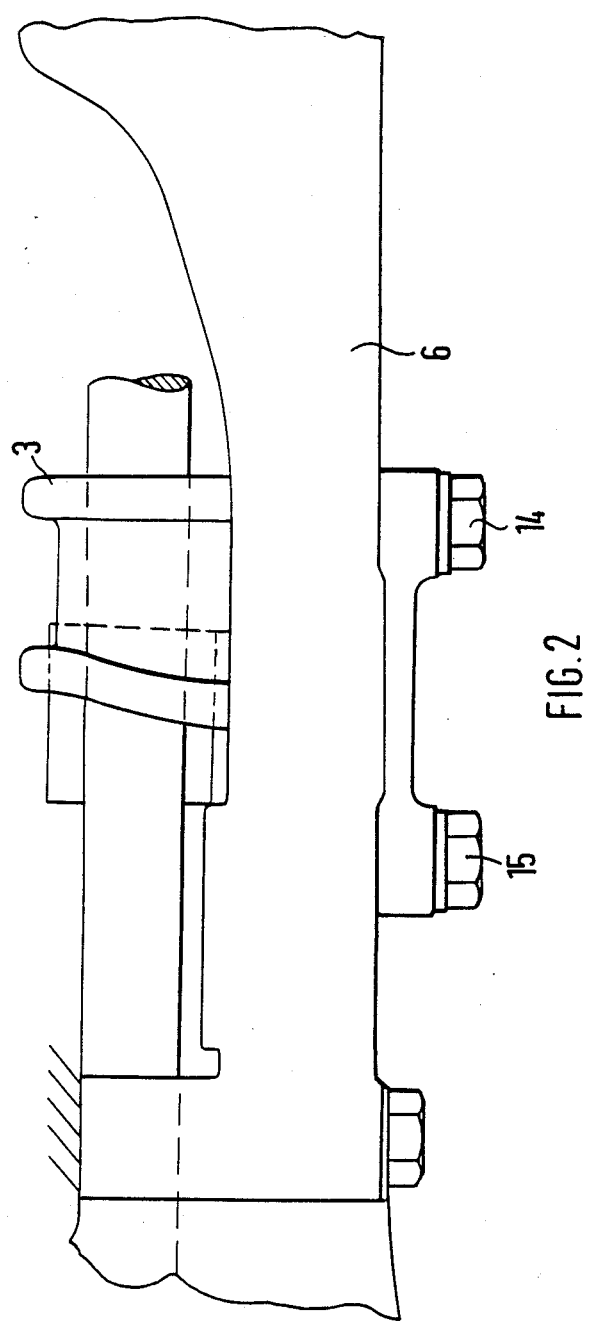
FIG. 2 is an elevational view on a cross bearer with longitudinal bearer taken in the direction of arrow Z of FIG. 3.
Figure 3:
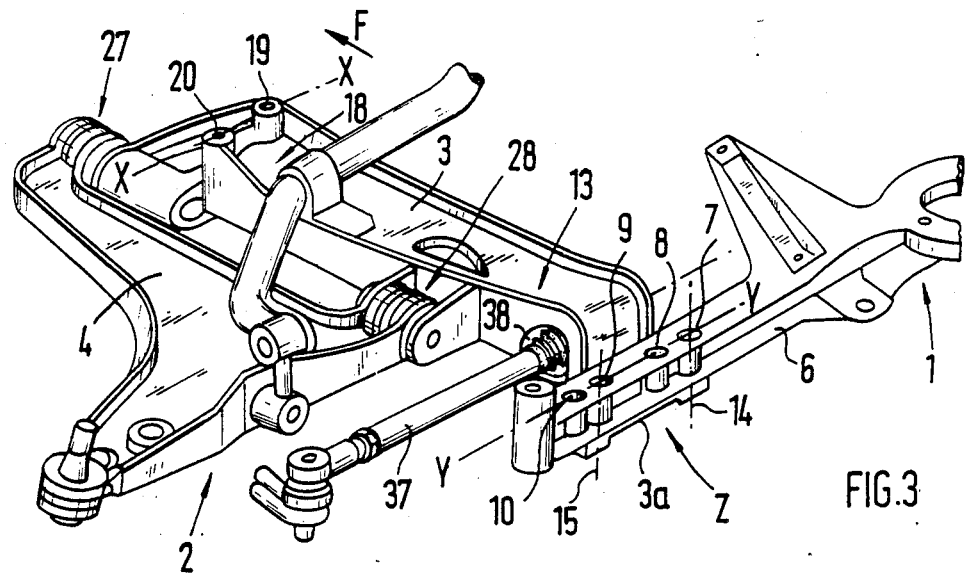
FIG. 3 is a perspective view of the left part of the front axle according to FIG. 1.
Figure 4:
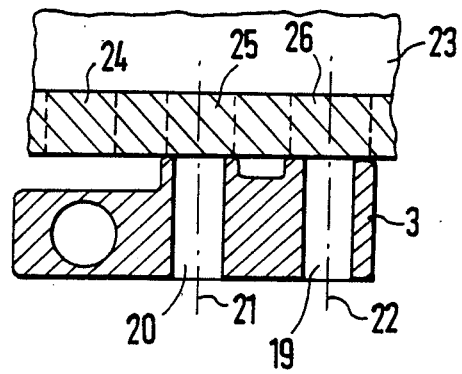
FIG. 4 is a cross-sectional view through the forward end of the longitudinal bearer—in relation to the driving direction—taken along line IV—IV of FIG. 1.
Figure 5:
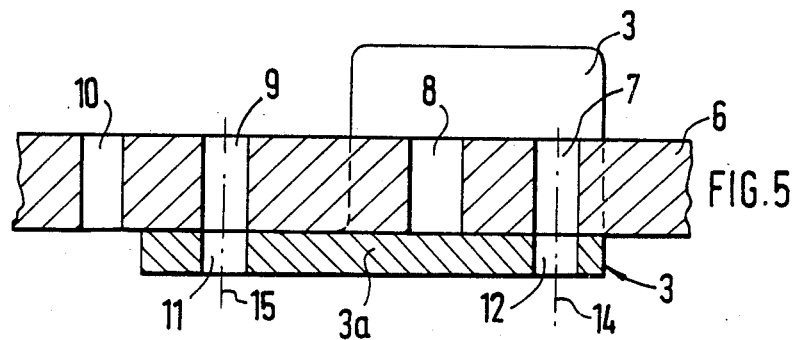
FIG. 5 is a cross-sectional view through the rear end of the longitudinal bearer taken along line V—V of FIG. 1.

Referring now to the drawing wherein like reference numerals are used throughout the various views to designate like parts, the front axle 1 essentially includes for each wheel of a vehicle side a wheel guide unit generally designated by reference numeral 2 consisting of a longitudinal bearer 3 and of a wheel guide member 4 (FIGS. 1 and 2). The wheel guide unit 2 is adapted to be installed in a vehicle with a track width according to position A, as shown in FIG. 1, and in position (B) as shown in dash lines. For that purpose, through-bores 7, 8, 9 and 10 (FIGS. 3 and 5) are provided in the cross bearer 6 whereby two each of these bores 7 and 9, respectively, 8 and 10 correspond with two bores 11 and 12 in the longitudinal bearer 3 arranged in a rear end 13 of the longitudinal bearer 3—in relation to the driving direction F. The longitudinal bearer 3 is adapted to be detachably connected with the cross bearer 6 by way of bolts which are symbolically indicated in FIG. 5 as center lines and which are secured at the cross bearer by way of nuts 16 and 17 (FIG. 1). The oppositely disposed forward free end 18 of the longitudinal bearer 3 also includes through-bores 19 and 20 in which bolts 21 and 22 that are symbolically illustrated in FIG. 4 as center lines are arranged and are connected with the vehicle body.

With a use of the wheel guide unit 2, for example, for a track width in another vehicle, the longitudinal bearer 3 is displaced with its forward end 18 and its rear end 13 to the adjacent bores, respectively, fixing arrangements, in the illustrated example to the free bores 8 and 10 in the cross bearer 6 as well as to the fastening arrangements 24 and 25 in the vehicle body 23 and a connection is established by way of the threaded means 14, 15 and 21, 22. Only the position A is shown in the drawings. With the use of the corresponding through-bores 9, respectively, 8, 10 in the cross bearer as well as of the corresponding fastening arrangements 25, 26, respectively, 24, 25 in the vehicle body 23, a position B having a wider track is achieved which is indicated in FIG. 1 in dash and dotted lines by reference to the position of the longitudinal bearer 3.

The fastening bolts 21 and 22 at the forward end 18 of the longitudinal bearer 3 serve at the same time for the indirect fastening of the wheel guide unit 2 at the vehicle body 23 whereby the cross bearer 6 is adapted to be fixed at the vehicle body 23 independently of the longitudinal bearer 3.

The wheel guide member 4 of the wheel guide unit 2 is retained on the outside of the longitudinal bearer 3 supported by way of two joints 27 and 28, whereby the rear second joint 28—in relation to the driving direction F—is arranged between two flanges 29 and 30 (FIG. 1) laterally formed-on at the longitudinal bearer and the forward first joint 27 is retained end-face of the longitudinal bearer 3 on a bolt 31 arranged approximately in a horizontal plane and extending in the vehicle longitudinal direction. Both joints 27 and 28 form a guide member pivot axis 32 extending approximately in the vehicle longitudinal direction and parallel to the vehicle longitudinal axis.

The joints 27 and 28 are retained at the wheel guide member 4 in projecting formed-on bearing eyes 33 and 34 (FIG. 1) whereby the forward bearing eye 33 assumes a parallel position to the end face 35 of the longitudinal bearer 3. The joints 27 and 28 are constructed with different characteristics whereby the forward joint 27 is constructed softer in the radial and axial direction than the rear joint 28 and for that purpose is provided with reniform recesses 40 and 41. The inwardly disposed recess 40 is constructed larger than the outwardly disposed recess 41 so that in particular with forces acting on the wheel during a braking operation a toe-out adjustment is achieved. The rear bearing 28 forms an imaginary rotary pole 42 with an elastokinematic wheel adjustment by reason of its construction.

A steering arrangement 36 (FIG. 1) connected with the cross bearer 6 is arranged disposed inwardly of the cross bearer 6—in relation to the driving direction F—and includes a tie rod 37 (FIG. 3) connected with the wheel carrier which extends through the longitudinal bearer 3 at its rear end 13. For that purpose, the longitudinal bearer 3 is provided with a through-opening 38 which is disposed directly adjacent a fastening section 3a to the cross bearer.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A front axle for motor vehicles having a relatively fixed body part and used for different track widths, comprising cross bearer means secured at the relatively fixed part and operatively connected at one end with a longitudinal barrier that pivotally supports a wheel guide means through plural joint means, the operative connection of the longitudinal bearer means with the cross bearer being by way of threaded means that can attach the longitudinal bearer means at one of two vehicle track width positions with respect to the cross bearer means.

2. A front axle according to claim 1, wherein the longitudinal bearer means has two end sections that include first and second bore means, respectively, for the threaded means and which are disposed adjacent one another width-wise in a respective cross plane of the vehicle, and said first bore means being arranged to correspond with bore means in the cross bearer means, and said second bore means being arranged to correspond to fastening means in the relatively fixed part.

3. A front axle according to claim 2, wherein the threaded means include fastening bolts that are inserted in the bore means of the longitudinal bearer means for fastening the longitudinal bearer means and its pivoted wheel guide unit at the relatively fixed part and at the cross bearer means.

4. A front axle according to claim 3, wherein one end section of the longitudinal bearer means includes mounting means for one of the joint means pivotally connecting the wheel guide means to said longitudinal bearer, said mounting means being arranged end-face of the longitudinal bearer and disposed in a substantially horizontal plane; a further joint means retained at an outside facing edge of the longitudinal bearer means between two flanges formed on the longitudinal bearer means; said two joint means together forming an axis of rotation for the wheel guide means that extends approximately parallel to the vehicle longitudinal direction.

5. A front axle according to claim 4, wherein the two joint means are adapted to be fixed in joint eyes protrudingly formed-on the wheel guide means and extending in a direction toward the longitudinal bearer means; the two joint means comprising rubber-metal elements; one of the joint means being located forward of the other joint means along the vehicle length and being constructed softer in the radial and axial direction than the other joint means and being provided with reniform recesses in a horizontal plane which are constructed with different dimensions in the radial direction in such a manner that the inwardly disposed recess is constructed larger than the outwardly disposed recess.

6. A front axle according to claim 5 wherein a steering gear means is mounted on the cross bearer means, wherein an end section of the longitudinal bearer means faces the cross bearer means and is provided with a through-opening for a transversely extending tie rod of the steering gear means and includes a fastening section extending over the cross bearer means from the underside; and wherein the fastening section includes the bore means for the fastening bolts of the threaded means.

7. A front axle according to claim 1, wherein the threaded means includes fastening bolts in the longitudinal bearer means which are constructed for fastening the longitudinal bearer at the relatively fixed part.

8. A front axle according to claim 1, wherein one end section of the longitudinal bearer means includes mounting means for one of the joint means pivotally connecting the wheel guide means to said longitudinal bearer, said mounting means being arranged end-face of the longitudinal bearer and disposed in a substantially horizontal plane; a further joint means retained at an outside facing edge of the longitudinal bearer means between two flanges formed on the longitudinal bearer means; said two joint means together forming an axis of rotation for the wheel guide means that extends approximately parallel to the vehicle longitudinal direction.

9. A front axle according to claim 8, wherein the two joint means are adapted to be fixed in joint eyes protrudingly formed-on the wheel guide means and extending in a direction toward the longitudinal bearer means; the two joint means comprising rubber-metal elements; one of the joint means being located forward of the other joint means along the vehicle length and being constructed softer in the radial and axial direction than the other joint means and being provided with reniform recesses in a horizontal plane which are constructed with different dimensions in the radial direction in such a manner that the inwardly disposed recess is constructed larger than the outwardly disposed recess.

10. A front axle according to claim 1 wherein a steering gear means is mounted on the cross bearer means, wherein an end section of the longitudinal bearer means faces the cross bearer means and is provided with a through-opening for a transversely extending tie rod of the steering gear means and includes a fastening section extending over the cross bearer means from the underside and wherein the fastening section includes the bore means for the fastening bolts of the threaded means.

* * * * *